(12) United States Patent
Lugo Beauchamp et al.

(10) Patent No.: US 10,890,959 B2
(45) Date of Patent: Jan. 12, 2021

(54) VOLTAGE CORRELATION CALCULATION

(71) Applicant: Hewlett Packard Enterprise Development LP, Houston, TX (US)

(72) Inventors: Wilfredo E. Lugo Beauchamp, Aguadilla, PR (US); Robert McCarthy, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 418 days.

(21) Appl. No.: 15/883,796

(22) Filed: Jan. 30, 2018

(65) Prior Publication Data
US 2019/0235596 A1 Aug. 1, 2019

(51) Int. Cl.
*G06F 11/30* (2006.01)
*G06F 1/28* (2006.01)

(52) U.S. Cl.
CPC ...................... *G06F 1/28* (2013.01)

(58) Field of Classification Search
CPC ........................................................ G06F 1/28
See application file for complete search history.

(56) References Cited

U.S. PATENT DOCUMENTS

| 7,679,873 | B2 | 3/2010 | Ziegler | |
| 9,454,888 | B2* | 9/2016 | Xie | G08B 29/181 |
| 2011/0004575 | A1* | 1/2011 | Yang | G06F 1/324 |
| | | | | 706/12 |
| 2019/0310321 | A1* | 10/2019 | Mi | G01R 31/3835 |

FOREIGN PATENT DOCUMENTS

CN 103778280 7/2016

OTHER PUBLICATIONS

Xuling, L. et al.; "Analysis and Validation of Power Batteries Uniformity for Electric Vehicles"; 2015; 5 pages.

* cited by examiner

*Primary Examiner* — Phuong Huynh
(74) *Attorney, Agent, or Firm* — Hewlett Packard Enterprise Patent Department

(57) ABSTRACT

A system comprising an energy storage device including a plurality of cells and a sensor per cell to provide the voltage of each cell; and a device to read the voltages of each cell, calculate a correlation between the voltages of each cell, store a result of the calculation, and set a threshold for the result, wherein in response to the result meeting the threshold, the device to send a notification including a message stating a potential failure of the energy storage device.

20 Claims, 3 Drawing Sheets

VOLTAGE CORRELATION CALCULATION

BACKGROUND

Energy storage devices may be used in servers to back up components in case of total power failure. If total power failure does occur, the energy storage devices may keep those components powered for a certain period of time, during which the components may write data to a non-volatile machine-readable storage medium. However, energy storage devices may experience cell voltage separation. Cell voltage separation may cause energy storage device failure, which may affect system performance.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

Energy storage devices may be used in servers to back up components in case of total power failure. If total power failure does occur, the energy storage devices may keep those components powered for a certain period of time, during which the components may write data to a non-volatile machine-readable storage medium. However, energy storage devices may experience cell voltage separation. Cell voltage separation may cause energy storage device failure, which may affect system performance.

Examples described herein may utilize sensors associated with or included with each of the cells of an energy storage device. An energy storage device may include a plurality of cells. Each cell may store the same amount of energy. The voltage of each cell may be the same. Each cell may self-discharge and lose capacity at a different rate. Over time, this variation may cause cell voltages to diverge. This example is called cell voltage separation. If an energy storage device is not replaced in such examples, the energy storage device may fail. If the energy storage device fails, the system may experience performance issues and components may not have a backup power source. Each sensor associated with a cell may provide a voltage reading. A device may read the voltage of a cell from the sensor. The device may calculate a correlation calculation based on the voltages read over time. The correlation may be utilized to determine whether cell voltage separation exists. The device may store the correlation calculation results in the device or some other non-volatile memory in the device or associated with the device.

Accordingly, various examples described herein may include a system comprising an energy storage device including a plurality of cells and a sensor per cell to provide the voltage of each cell; and a device to read the voltages of each cell, calculate a correlation between the voltages of each cell, store a result of the calculation, and set a threshold for the result, wherein in response to the result meeting the threshold, the device to send a notification including a message stating a potential failure of the energy storage device.

Figure 1:
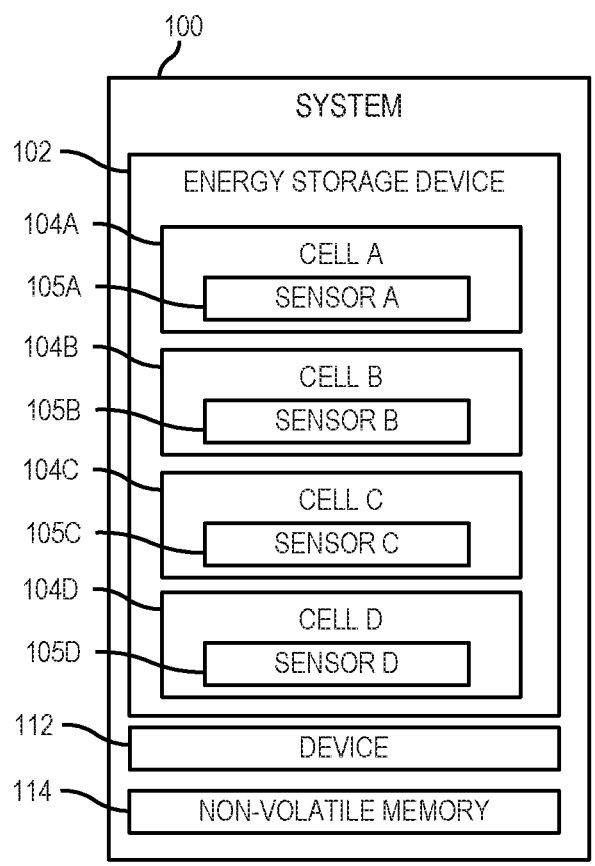
FIG. 1 is a block diagram of a system including an energy storage device, including a plurality of cells and sensors, and a microcontroller.

FIG. 1 is a block diagram of a system 100 including an energy storage device 102, including a plurality of cells 104 and sensors 105, and a device 112. As noted, the energy storage device 102 may include a plurality of cells 104. Each cell 104 may include a sensor 105. The sensor 105 may measure the voltage stored in the cell 104. A device 112 may read the voltage from the sensor 105. The device 112 may use the voltages from each sensor 105 to calculate a correlation. Once a correlation is calculated, the device 112 may store the results in a non-volatile memory 114. The device 112 may also set a threshold. In response to the correlation reaching the threshold, the device 112 may send a notification. The notification may include a message that indicates that the energy storage device 102 may fail at some point in time. The notification may include the time until energy storage device 102 failure.

As used herein, a "computing device" may be a storage array, storage device, storage enclosure, server, desktop or laptop computer, computer cluster, node, partition, virtual machine, or any other device or equipment including a controller, a processing resource, or the like. In examples described herein, a "processing resource" may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Any machine-readable storage medium described herein may be non-transitory.

As used herein, a "device" may be any microcontroller, BMC, circuit, CPU, microprocessor, GPU, FPGA, chassis manager, rack level manager, server, other electronic circuitry suitable to read sensor data, perform calculations, and send notifications or alerts, or a combination thereof. For example, the device may be a BMC of a server. In another example, the device may be a microcontroller. In such examples, the device may have access to sensor data, as well as the ability to perform calculations and notify users of critical events. In such examples, the device may read the sensors and perform correlation calculations for each energy storage device within the system.

As used herein, a "Baseboard Management Controller" or "BMC" is a specialized service processor that monitors the physical state of a server or other hardware using sensors and communicates with a management system through an independent "out-of-band" connection. The BMC may also communicate with applications executing at the OS level through an input/output controller (IOCTL) interface driver, a Representational state transfer (REST) application program interface (API), or some other system software proxy that facilitates communication between the BMC and applications. The BMC may have hardware level access to hardware devices located in a server chassis. The BMC may be able to directly modify the hardware devices. The BMC may operate independently of the OS of the system that the BMC is located in. The BMC may be located on the motherboard or main circuit board of the server or other device to be monitored. The fact that a BMC is mounted on a motherboard of the managed server or otherwise connected or attached to the managed server does not prevent the BMC from being considered "separate". As used herein, a BMC has management capabilities for sub-systems of a computing device, and is separate from a processing resource that executes an OS of a computing device. The BMC is separate from a processor, such as a central processing unit, executing a high level OS or hypervisor on a system.

In an example and as noted above, the device 112 may be BMC. The BMC may include a processing resource and non-volatile storage. In such examples, the BMC may read the voltage from the sensors 105 over a system management bus (SMbus), inter-integrated circuit (I2C) bus, or some other bus suitable for communicating sensor readings and management signals. The BMC may use the sensor 105 readings to calculate the correlation. The BMC may then store the correlation calculations in the non-volatile storage or some other non-volatile machine-readable storage medium (such as, the non-volatile memory 114).

As described above, the device 112 may store the correlation calculations in non-volatile memory 114. In an example, the device 112 may include non-volatile memory 114 (as noted above, in the instance that the device 112 is a BMC). The device 112 may store the correlation calculations in the included non-volatile memory 114. However, in such examples, the size of the non-volatile memory 114 may be limited. In the instance that the non-volatile memory 114 has limited space, the device 112 may store the correlation calculations off of the device 112. In other words, the device 112 could store the correlation calculations in another machine-readable storage medium. For example, the system 100 may include a motherboard. The motherboard may include a plurality of components. One such component could be a NAND storage chip (or some other non-volatile machine-readable storage medium). In the case that the device 112 may have access to the component, the device 112 could store the correlation calculations in the component. In another example, the system 100 may include a hard drive (whether it be a hard disk drive, a solid state drive, or any other drive to store machine-readable instructions). In such examples, the device 112 may store the correlation calculations in the hard drive of the system 100.

As noted above, the device 112 may calculate a correlation between the voltages of each cell 104. In an example, the device 112 may use a Pearson's correlation calculation. In such examples, the device 112 may calculate the correlation for two cells at a time. In a further example, the correlation calculation consider the voltages of the cells 104 over time. For example, Pearson's correlation calculation may be represented by the following formula for cell A 104A and cell B 104B $$\frac{\operatorname{cov}(\text{Cell } A \text{ Voltage, Cell } B \text{ Voltage})}{\sigma(\text{Cell } A \text{ Voltage})\sigma(\text{Cell } B \text{ Voltage})}$$

As is shown above, the covariance of the product of cell A's 104A voltage and cell B's 104B voltage is divided by the standard deviation of cell A's 104A voltage and cell B's 104B voltage. The result may be a value between positive one and negative one. If the result is positive one or close to positive one, then the correlation may be considered normal or healthy and both cell A 104A and cell B 104B are operating at the same or close to the same voltage. A zero, or values closer to zero, could indicate that no correlation exists at the moment of the calculation. Finally, a negative one or close to negative one may indicate that there is a negative correlation. In other words, a negative one may indicate a total failure of the energy storage device 102. The Pearson's correlation calculation may be calculated on a scheduled basis or a pre-set or pre-determined basis. Various thresholds may be set to determine when a user may be notified of a potential failure of an energy storage device 102. For example, a correlation of around 0.85 may still be considered normal operating values. However, a user may wait to order new parts until the energy storage device 102 is closer to failure. The threshold may be set according to when a user would like to be notified of an impending energy storage device 102 failure.

As described above, the device 112 may send a notification. In another example, the device 112 or a user may configure or create a Simple Network Management Protocol (SNMP) trap. Once the threshold is met, the SNMP trap may be triggered and sent to a specified device, address, email address, user, administrator, or the like. In another example, the device 112 may send a direct alert in response to the threshold being met by the correlation calculation. In another example, the device 112 may connect to the internet or an intranet. In response to the threshold being met by the correlation calculation, the device 112 may send the notification over the internet or intranet to a specified device, address, email address, user, administrator, or the like.

In another example, in response to the threshold being met by the correlation calculation and some other condition being met, the device 112 may send the notification. In an example, the other condition may be another threshold based on an actual voltage difference between cells 104. In such examples, the device 112 may calculate the voltage difference of the cells 104 (e.g., the voltage difference between cell A 104A and cell B 104B) before or after the correlation calculation. The voltage difference may highlight and/or classify large separations versus small separations. The threshold for the voltage difference may be based in part on the voltages the cells 104 should store and/or the energy storage device's 102 behaviors.

In another example, the energy storage device 102 may be a battery, capacitor, or super-capacitor. For example, the battery may be a lithium ion battery. In another example, the energy storage device 102 may be composed of a plurality of cells 104. In another example, the energy storage device 102 may contain an even amount of cells 104. In such examples, the plurality of cells 104 are paired. Each cell pair (for example, cell A 104A and cell B 104B, cell C 104C or cell D 104D, or some combination thereof) may charge and discharge at the same rate. If one cell (for example, cell A 104A) starts discharging faster and storing a lower voltage, the other cell in the pair (for example, cell B 104B) may attempt to compensate and charge to a higher than normal voltage. For example, a pair of cells (e.g., cell A 104A and cell B 104B) may store four volts each. In the case that one of the cells (for example, cell A 104A) charges to three and a half volts, the other cell (for example, cell B 104B) may try to compensate by charging to four and a half volts. As described above, this may be referred to as cell voltage separation. As the voltages stored in each cell separate further (e.g., cell A 104A and cell B 104B), the energy storage device 102 becomes more susceptible to failure. In such examples, in response to the cell voltage reaching a certain threshold (in other words, the correlation calculation reaching the threshold), the device 112 may send a notification, the notification including a time until energy storage device 102 failure.

Figure 2:
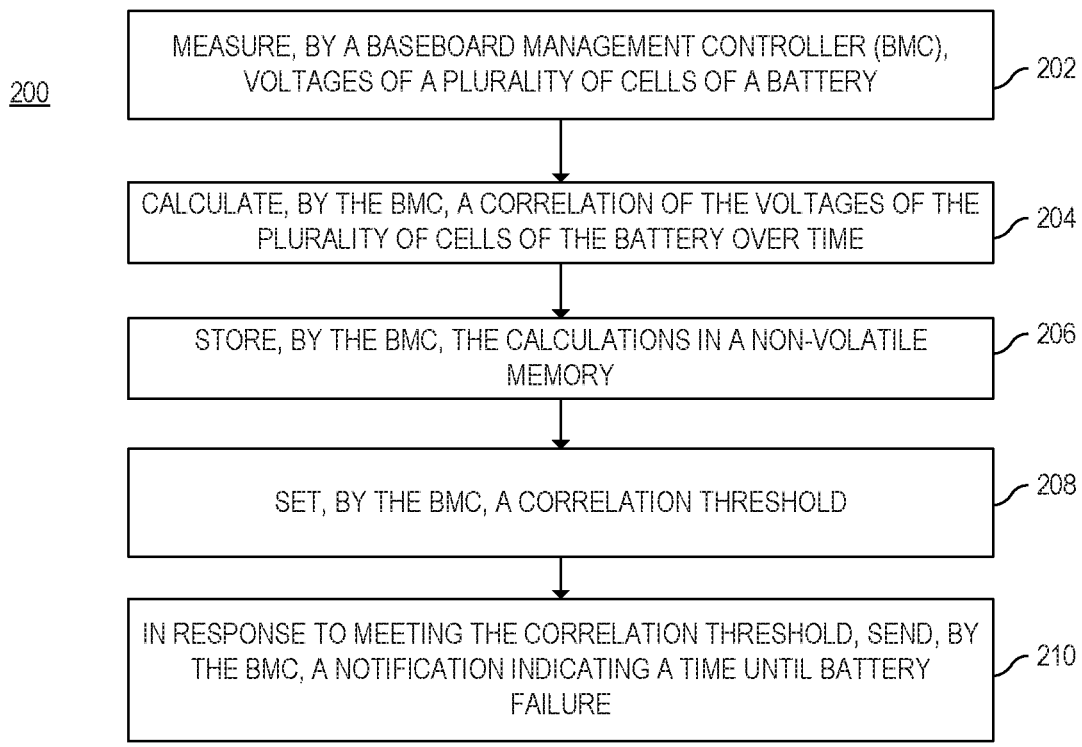
FIG. 2 is a flowchart of a method to calculate a correlation of voltages and send a notification in response to the correlation meeting a threshold.

FIG. 2 is a flowchart of a method to calculate a correlation of voltages and send a notification in response to the correlation meeting a threshold. Although execution of method 200 is described below with reference to the system 100 of FIG. 1, other suitable systems or modules may be utilized, including, but not limited to, computing device 300. Additionally, implementation of method 200 is not limited to such examples.

At block 202, a device 112, for example a BMC, may measure the voltages of a plurality of cells 104 of an energy storage device 102, for example a battery. The device 112 (e.g., the BMC) may read the voltages from a plurality of sensors 105 over a SMbus, I2C bus, or other suitable bus.

In another example, the device 112 (e.g., the BMC) may store the measurements or voltage readings temporarily. The device 112 (e.g., the BMC) may not perform calculations as soon as the voltage readings are received. In such examples, the device 112 (e.g., the BMC) may store the measurements in a non-volatile or volatile memory associated with the device 112 (e.g., the BMC).

At block 204, the device 112 (e.g., the BMC) may calculate the correlation of the voltages of the plurality of cells 104 of the energy storage device (e.g., the battery) over time. In an example, the device 112 (e.g., the BMC) may calculate the correlation using the covariance of the voltages measured divided by the standard deviation of each voltage. In another example, the device 112 (e.g., the BMC) may use Pearson's correlation to calculate the correlation. In such examples, the device 112 (e.g., the BMC) may produce a number ranging between positive one and negative one. The value of positive one may represent a perfect or linear correlation, while a value of negative one represents diverging values and a negative linear correlation, as in one voltage increases while the other voltage decreases. A value of zero represents no linear correlation. In such examples, a value of positive one may indicate a healthy energy storage device 102 (e.g., the battery), while all values closer to zero and on to negative one may represent an energy storage device 102 (e.g., the battery) experiencing cell voltage separation and potential or imminent failure.

In an example, the device 112 (e.g., the BMC) may calculate the correlation in pairs. As noted, the energy storage device 102 (e.g., the battery) may pair cells 104. The paired cells (for example, cell A 104A and cell B 104B, cell C 104C or cell D 104D, or some combination thereof) may store the same voltage, but that may not always be the case due to cell voltage separation. Since the cells 104 are paired, the device 112 (e.g., the BMC) may calculate the correlations in pairs. In another example, the device 112 (e.g., the BMC) may utilize multiple readings from multiple cells 104 to calculate the correlation.

At block 206, the device 112 (e.g., the BMC) may store the correlation calculation in a non-volatile memory 114. In an example, the non-volatile memory 114 may be included on the device 112 (e.g., the BMC). In another the non-volatile memory 114 may be a machine-readable storage medium included on the motherboard. In another example, the device 112 (e.g., the BMC) may store the calculations on the systems hard drive, as described above.

In another example, the device 112 (e.g., the BMC) may delete calculations after a specified time period. Non-volatile memory 114 associated with the device 112 (e.g., the BMC) may be small, in regards to the amount of data that may be stored on the non-volatile memory 114. Due to the small size, a record or piece of data may not be kept for lengthy periods of time. In such examples, a user may set how long the correlation calculations should be kept. In another example, the device 112 (e.g., the BMC) may delete the correlation calculations automatically after a certain period of time. The deletions may be time based. For example, the device 112 may delete the oldest correlation calculations first and preserve the more recent correlation calculations, thus the latest state of the cells 104 may be preserved.

At block 208, the device 112 (e.g., the BMC) may set the correlation threshold. The device 112 (e.g., the BMC) may initially set the threshold to a predetermined number. For example, the device 112 (e.g., the BMC) may set the default threshold to 0.85. In another example, a user may set the threshold in the device 112 (e.g., the BMC) via an interface. In such examples, the interface may be a web user interface (WUI) or a graphical user interface (GUI). The user may select the threshold for the device 112 (e.g., the BMC) to enforce in regards to the correlation calculation. In an example, the threshold may be related to the amount of time until energy storage device 102 (e.g., battery) failure. For example, a higher threshold may indicate (for example, 0.90), if the threshold is met, that the energy storage device 102 (e.g., the battery) may fail further out in time. A lower threshold (for example, 0.65) may indicate, if the threshold is met, that the energy storage device 102 (e.g., the battery) may fail sooner, such as in days rather than weeks or months.

At block 210, the device 112 (e.g., the BMC) may send a notification indicating time until energy storage device 102 (e.g., battery) failure, in response to the correlation threshold being met. In other words, the device 112 (e.g., BMC) may send a notification indicating that a user may replace the energy storage device 102 (e.g., a battery) with a new energy storage device. As noted above, the message may be sent through a SNMP trap or directly from the device 112 (e.g., the BMC). In another example, the message may include more than a notification indicating time until energy storage device 102 (e.g., battery) failure. In such examples, the message may include other information such as the amount of energy storage devices 102 (e.g., batteries) in the system 100, the specific cells 104 that may potentially fail, and any other information useful in diagnosing energy storage device 102 (e.g., battery) failure. In another example, based on different thresholds used, the device 112 may generate a new pre-failure state message.

Figure 3:
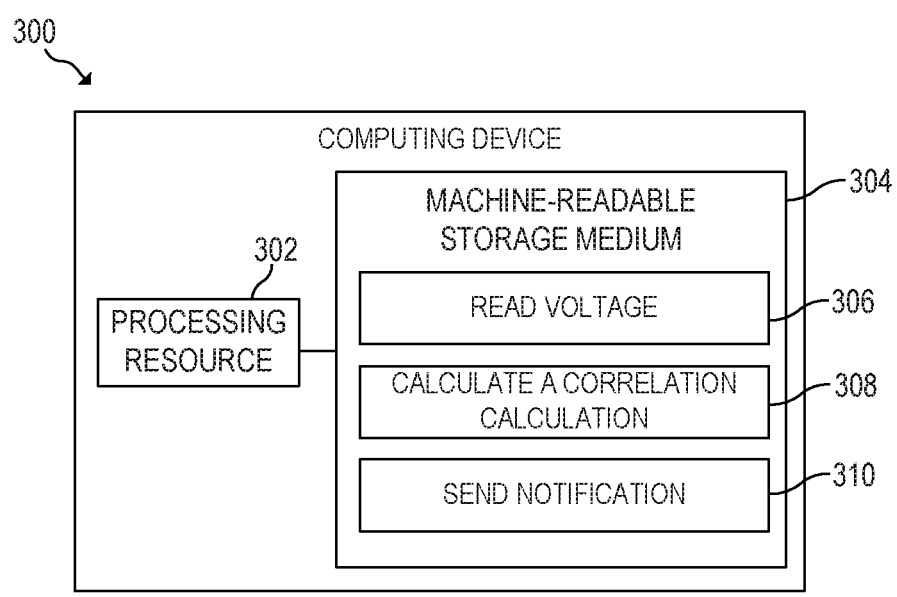
FIG. 3 is a block diagram of a computing device capable of reading voltages, calculating a correlation between the voltages, and sending a notification in response to the correlation meeting a threshold.

FIG. 3 is a block diagram of a computing device 300 capable of reading voltages, calculating a correlation between the voltages, and sending a notification in response to the correlation meeting a threshold, according to one example. The computing device 300 may include a processing resource 302 and a machine-readable storage medium 304. The processing resource 302 may execute instructions included in the machine-readable storage medium 304. The machine-readable storage medium 304 of the computing device 300 may include instructions 306 to read voltages from sensors on each of a plurality of cells in a battery. In such an example, the computing device 300 may include a battery. The battery may include multiple cells. Each cell may include a sensor. Each sensor may measure the voltage stored in the cell it is included on. Thus a device or processing resource 302 may read the sensor to obtain the voltage associated with a particular cell.

The machine-readable storage medium 304 of the computing device 300 may include instructions 308 to calculate a correlation calculation utilizing the voltage per pair of cells in the battery over time. In such examples, when the instructions 308 are executed, the processing resource 302 may take the voltages read from the sensors and calculate the correlation per pair of cells. Each cell of the battery may be paired with another cell of the battery. As noted, the paired cells may store the same amount of voltage. To ensure the pairs of cells do not have cell voltage separation, the correlation is calculated for each pair.

The machine-readable storage medium 304 of the computing device 300 may include instructions 310 to, in response to the correlation calculation nearing or reaching a user set threshold, send a notification including a time until battery failure or pre-failure due to cell voltage separation. In an example, the pairs of cell voltages may be around the same voltage. When one cell in a pair starts to discharge voltage at a greater rate and does not recharge to the same voltage, the other cell in the pair may compensate, by overcharging. The correlation calculation may show such occurrences. For example, a user may set the threshold to 0.75. When the correlation calculation reaches 0.75 the processing resource 302 may send a notification. The time left until battery failure may be indicated by the user set threshold. For example a correlation calculation of 0.75 may indicate that battery failure could occur in three weeks or some other time determined by calculations. In another example, the threshold may be set based on days before failure, weeks before failure, or months before failure.

In a further example, a correlation calculation of between 0.85 and 1 may mean that the battery is healthy. In another example, a notification may be sent periodically after the correlation calculation reaches the threshold. In such an example, if the correlation calculation stays at the threshold or exceeds the threshold for a period of time before corrective action (such as replacing the failing battery) is taken, then a notification may be sent periodically, indicating battery failure or the time before battery failure. In such examples, the notification can be sent weekly, daily, hourly, or at some other user specified time period. The notification may also be sent every time a new correlation calculation is taken.

Although the flow diagram of FIG. 2 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be examples. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A system comprising:
an energy storage device including a plurality of cells and a sensor per cell to provide the voltage of each cell; and
a device to read the voltages of each cell, calculate a correlation between the voltages of each cell, store a result of the calculation, and set a threshold for the result, wherein in response to the result meeting the threshold, the device to send a notification including a message stating a potential failure of the energy storage device.

2. The system of claim 1, wherein the device is a baseboard management controller (BMC).

3. The system of claim 1, wherein the device to store calculations in a machine-readable storage medium associated with the device.

4. The system of claim 1, wherein the correlation is calculated using Pearson's Correlation.

5. The system of claim 1, wherein the energy storage device is a battery.

6. The system of claim 1, wherein the energy storage device is a capacitor.

7. The system of claim 1, wherein the message includes a time until energy storage device failure.

8. The system of claim 1, wherein the threshold is adjustable.

9. The system of claim 1, wherein the threshold is based in part on time before failure.

10. The system of claim 1, wherein the correlation for multiple cells are calculated in pairs.

11. A method comprising:
measuring, by a baseboard management controller (BMC), voltages of a plurality of cells of a battery;
calculating, by the BMC, a correlation of the voltages of the plurality of cells of the battery over time;
storing, by the BMC, the calculations in a non-volatile memory;
setting, by the BMC, a correlation threshold; and
in response to meeting the correlation threshold, sending, by the BMC, a notification indicating a time until battery failure.

12. The method of claim 11, wherein the correlation threshold is relative to the time until battery failure.

13. The method of claim 11, wherein the correlation of the voltages of the plurality of cells of the battery over time is calculated per pairs of cells.

14. The method of claim 11, wherein the BMC includes the non-volatile memory.

15. The method of claim 14, wherein the BMC and the battery are included in a computing device.

16. A non-transitory machine-readable storage medium encoded with instructions executable by a processor, the non-transitory machine-readable storage medium comprising, instructions to:
   read the voltage from a sensor on each of a plurality of cells in a battery;
   calculate a correlation calculation utilizing the voltage per pair of cells in the battery over time; and
   in response to the correlation calculation nearing a user set threshold, send a notification including a time until battery failure due to cell voltage separation.

17. The non-transitory machine-readable storage medium of claim 16, wherein a BMC includes the processor and non-transitory machine-readable storage medium.

18. The non-transitory machine-readable storage medium of claim 17, wherein the user set threshold is set through a user interface of the BMC.

19. The non-transitory machine-readable storage medium of claim 16, wherein the correlation calculation ranges from −1 to 1.

20. The non-transitory machine-readable storage medium of claim 19, wherein correlation calculations closer to 1 indicate a healthy battery and correlation calculations ranging from 0.85 to −1 indicate cell voltage separation.

\* \* \* \* \*